(12) United States Patent
Aizawa

(10) Patent No.: US 6,860,155 B2
(45) Date of Patent: Mar. 1, 2005

(54) ELECTRICAL CAPACITANCE-TYPE DIAPHRAGM PRESSURE SENSOR AND A METHOD OF FABRICATING THE SAME

(75) Inventor: Mitsuyoshi Aizawa, Tokyo (JP)

(73) Assignee: Tem-Tech Lab. Co., Ltd., Tokyo (JP)

( * ) Notice: Subject to any disclaimer, the term of this patent is extended or adjusted under 35 U.S.C. 154(b) by 16 days.

(21) Appl. No.: 10/671,624

(22) Filed: Sep. 29, 2003

(65) Prior Publication Data

US 2004/0118211 A1 Jun. 24, 2004

(30) Foreign Application Priority Data

Dec. 4, 2002 (JP) ........................................ 2002-352704

(51) Int. Cl.[7] ................................................. G01L 9/12
(52) U.S. Cl. ......................................................... 73/724
(58) Field of Search ............................. 29/25.41, 25.42; 73/718, 724, 706; 361/283.4

(56) References Cited

U.S. PATENT DOCUMENTS 5,492,016 A * 2/1996 Pinto et al. .................... 73/724
5,965,821 A * 10/1999 Grudzien ........................ 73/724

* cited by examiner

Primary Examiner—William Oen
(74) Attorney, Agent, or Firm—Wenderoth, Lind & Ponack, L.L.P.

(57) ABSTRACT

A compact and highly accurate pressure sensor, and a method of fabricating the same are provided by improving functioning of a diaphragm which acts as a means for sensing a fluid pressure. An electrical capacitance-type diaphragm pressure sensor for sensing a fluid pressure is fabricated by providing non-metallic strip diaphragms in opposing relation to each other; forming deposited electrodes on the opposing surfaces of the diaphragms to form a pressure receiving part (10a) of a pressure-sensing member (10); depositing a metal on the diaphragms except for an end part of the pressure-sensing member where an electrode output terminal is formed; mounting a soluble flange along an approximate border between the end part and pressure receiving part of the pressure-sensing member; applying a nickel plating (22) as a protective layer to the pressure receiving part and the periphery of the flange; removing the flange except the nickel-plated protective layer; and mounting supporting members (31, 32) in the region where the flange was removed.

7 Claims, 3 Drawing Sheets

ELECTRICAL CAPACITANCE-TYPE DIAPHRAGM PRESSURE SENSOR AND A METHOD OF FABRICATING THE SAME

BACKGROUND OF THE INVENTION

The present invention pertains to a pressure sensor and a method of manufacturing the same, and in particular to an electrical capacitance-type diaphragm pressure sensor for sensing a fluid pressure in, for example, a container for chemicals, a pipe for chemicals, and the like, and a method of fabricating the same.

Conventional pressure sensors for sensing a fluid pressure in a container for chemicals, a pipe for chemicals, and the like, are provided with a diaphragm which acts as a pressure-sensing means, whereby deflection of the diaphragm in response to an applied pressure is translated into an electric signal, to thereby sense a pressure.

Japanese Patent Application No. 2002-130442 discloses as an example of such a diaphragm pressure sensor "Electrical capacitance-type diaphragm pressure sensor".

Such a diaphragm pressure sensor normally comprises: a pressure-sensing member provided with a pressure receiving part including strip diaphragms provided in opposing relation, and deposited electrodes formed on opposing surfaces of the diaphragms; and a housing member for enclosing the pressure receiving part of the pressure-sensing member, the housing member being made of a material resistant to corrosion by a fluid whose pressure is to be detected by the sensor.

Such a diaphragm pressure sensor is constituted such that when immersing a housing member in a fluid whose pressure is to be sensed, a fluid pressure acts on the pressure receiving part, and any resulting variations in a distance between opposing diaphragms causes a change in capacitance.

In a conventional diaphragm pressure sensor such as that described above, a gap is formed between a pressure receiving part of a pressure-sensing member and a housing member for enclosing the pressure-sensing member, so that a pressure acting on the housing member is transferred to the pressure receiving part of the pressure-sensing member via an applied pressure transfer material filling the gap. As an applied pressure transfer material used for filling such a gap, a silicone adhesive has been conventionally employed. Therefore, as a temperature of a fluid, etc. whose pressure is to be sensed changes, a pressure transfer coefficient varies, which results in drift, loss of linearity of a pressure transfer coefficient, and by extension, inaccurate operation of the pressure sensor.

SUMMARY OF THE INVENTION

The object of the present invention is to improve a diaphragm which functions as a sensing means for sensing a fluid pressure in a container for chemicals, a pipe for chemicals, and the like, and provide a highly accurate pressure sensor having a simple structure and a method of manufacturing the same.

An electrical capacitance-type diaphragm pressure sensor according to the present invention comprises: a pressure-sensing member provided with a pressure receiving part consisting of opposing strip diaphragms and a metal deposited on the diaphragms, with a nickel protective layer being formed directly over the pressure-sensing member. A pressure of a fluid whose pressure is to be sensed is transferred to the pressure receiving part via the nickel protective layer, and variations in an amount of a gap between the opposing diaphragms cause corresponding changes in electrostatic capacitance.

A method of fabricating an electrical capacitance-type diaphragm pressure sensor according to the present invention comprises the steps of: providing strip diaphragms in opposing relation to form a pressure-sensing member; depositing a metal on the diaphragms in the pressure-sensing member, except for an end thereof where an electrode output terminal is disposed, thereby forming a pressure receiving part; installing a soluble flange along the approximate border between the end part of the pressure-sensing member and the pressure receiving part; applying a nickel plating as a protective layer on the pressure receiving part and periphery of the flange in the pressure-sensing member; removing the flange except for the nickel-plated protective layer in the pressure-sensing member; and installing a protective member in a region where the flange was removed.

According to the present invention, a nickel plating as a protective layer is applied directly on the pressure receiving part which constitutes a part of the pressure-sensing member in the diaphragm pressure sensor, and therefore, unlike a conventional diaphragm pressure sensor, the present sensor does not require the use of an applied pressure transfer material such as a silicone adhesive, or the like. Thus, the present invention is able to provide a highly accurate pressure sensor free from unstable factors that otherwise occur as a result of variations in a pressure transfer coefficient of an applied pressure transfer material under temperature fluctuations, and the like, of a fluid whose pressure is to be sensed.

Further, according to the present invention, since an applied pressure transfer material such as a silicone adhesive, or the like, is not used, as mentioned above, the present pressure sensor is not susceptible to deflections at a negative pressure, even in a case that the sensor is placed in a vessel maintained under a vacuum. Thus, the diaphragm pressure sensor of the present invention, which is able to measure not only a positive pressure but also a negative pressure and vacuum, can be employed as a vacuum gage.

Still further, according to the present invention, the pressure-sensing member of the diaphragm pressure sensor is in the form of a strip, and a nickel plating is applied as a protective coating directly on the pressure receiving part. Thus, in accordance with the present invention, a very simple structure is provided, and a diaphragm pressure sensor can be readily fabricated.

DETAILED DESCRIPTION OF THE INVENTION

Figure 1A:
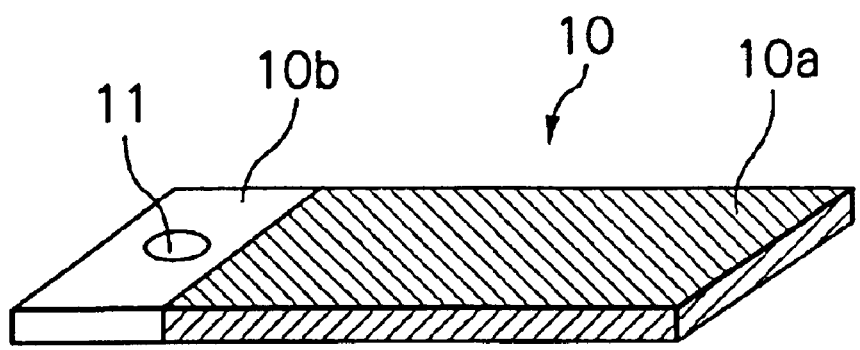
FIGS. 1A and 1B indicate a strip pressure-sensing member constituting the principal part of a diaphragm pressure sensor of the present invention and a basic manufacturing process for fabricating the member.
Figure 1B:
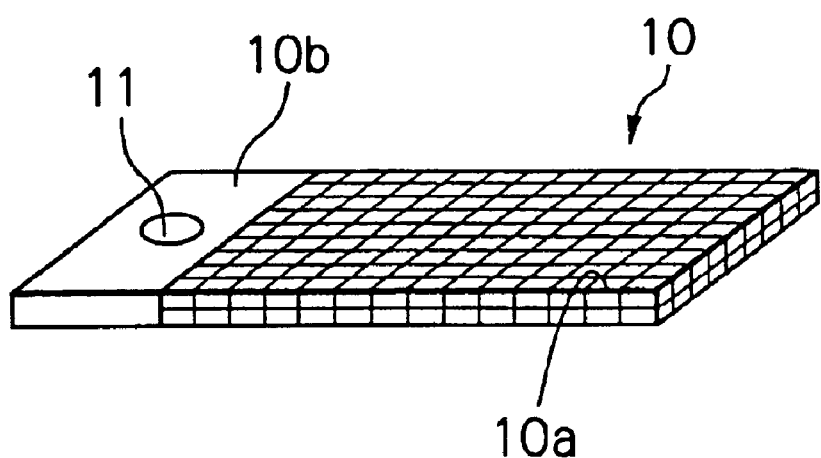

FIGS. 1A and 1B illustrate a strip pressure-sensing member 10 constituting the principal part of an electrical capacitance diaphragm pressure sensor and a basic manufacturing process for fabricating the member 10.

For the sake of simplicity of illustration, the pressure-sensing member 10 is indicated in the drawings only as a simple strip member. In reality, however, two strip diaphragms made of a non-metal material such as glass, sapphire, etc. are provided in opposing relation to each other with a spacer disposed between them, and deposited electrodes are formed on the opposing surfaces of the diaphragms, to thereby provide such diaphragms in the form of a single unit. The opposed deposited electrodes are coupled to the electrode output terminal via lead wires respectively.

A metal having a high ionization tendency such as tin, copper, silver, gold, etc. is deposited as a primary coating in a plating process on the diaphragms formed as a single unit, except for the end part 10b where an electrode output terminal is disposed, whereby a pressure receiving part 10a is formed (FIG. 1A). The deposited electrodes in the pressure receiving part 10a are electrically connected respectively to the electrode output terminal 11 formed on the end part 10b of the pressure-sensing member 10 via lead wires. The thus comprised pressure receiving part 10a constitutes an electrical capacitor due to the deposition of electrodes on opposing surfaces of each of the two diaphragms. Therefore, when the deflections occur as a result of a pressure acting on the pressure receiving part 10a, an amount of a gap between the deposited electrodes changes, which causes a change in electrostatic capacitance. Such a change in electrostatic capacitance is output as an electric signal from the electrode output terminal 11, and the output electric signal is converted to a pressure value.

Next, a supporting member on which the sensor is to be installed, for example, a container for chemicals, a pipe for chemicals, and the like, is formed on the pressure-sensing member 10 for sensing a fluid pressure in such a container, pipe, and the like. On the pressure-sensing member 10 and supporting member, there is applied by electric casting a nickel plating which acts as a protective layer (FIG. 1B), whereby an electrical capacitance-type diaphragm pressure sensor is obtained. By controlling a period of time in which the strip pressure-sensing member 10 is immersed in a plating solution and an applied plating current, nickel protective layer having a desired thickness can be formed. If the nickel protective layer is further immersed in a concentrated nitric acid, a passive state film is formed on the surface of the nickel, thereby making the pressure sensor corrosive-resistant to a strong acid solution.

It is desirable that the end part 10b constituting the electric signal part including the electrode output terminal 11 of the pressure sensor be covered by the plating protective coat 10c such as silicone, etc., so that the end part 10b remains unaffected by a plating solution.

FIGS. 2 and 3 illustrate an operation process for fabricating a practical pressure sensor.

In the strip pressure-sensing member 10 as indicated in FIG. 1A, a disc-like flange 20 (FIG. 2A) constituting a supporting member for installation of the sensor on a container for chemicals or a pipe for chemicals, is mounted on the approximate border between the pressure receiving part 10a onto which a metal having high ionization tendency is deposited and the end part 10b including the electrode output terminal 11. The disc-like flange 20 is molded out of a material such as silicone, wax, aluminum, and so on, such that in the center a through-hole is formed which corresponds to a cross-section of the pressure-sensing member 10. The pressure-sensing member 10 is inserted into the through-hole to be positioned along the approximate border between the pressure receiving part 10a and the end part 10b. In a case that the disc-like flange 20 is molded out of silicone or wax, a metal such as copper is deposited on the entire surface thereof. On the other hand, when the flange 20 is molded out of aluminum, no further working is necessary. The pressure-sensing member 10 and the disc-like flange 20 are adhered to each other in the metal deposited area by, for example, applying an electrically conductive silver paint 21 (FIG. 2B) to the area.

Figure 2A:
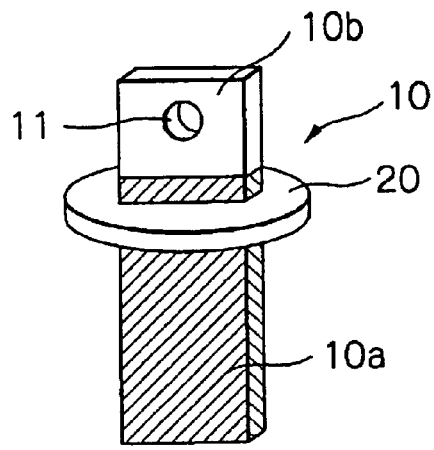
FIGS. 2A–2E illustrate a manufacturing process for fabricating a practical diaphragm pressure sensor according to the present invention.
Figure 2B:
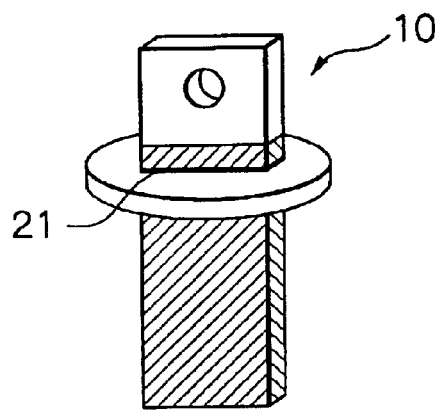
Figure 2C:
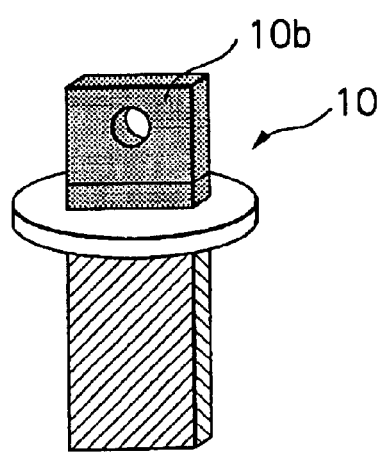
Figure 3A:
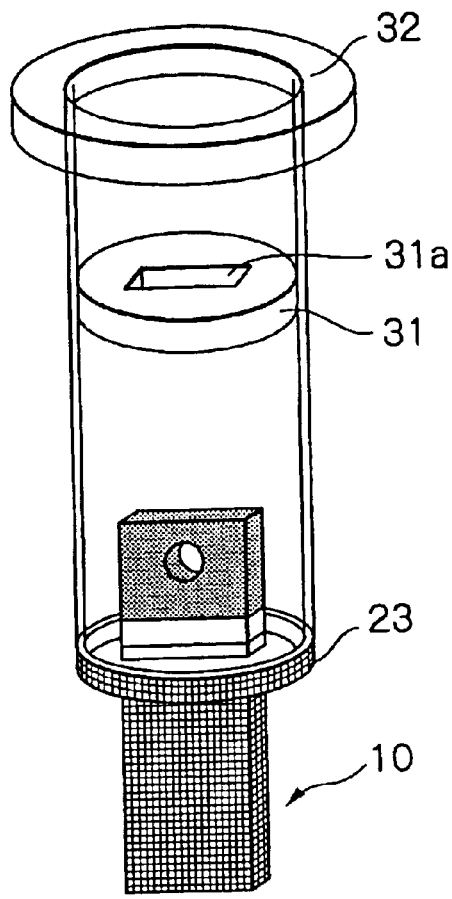
FIGS. 3A and 3B illustrate a manufacturing process for fabricating the practical diaphragm pressure sensor, especially a supporting member for installation of the sensor.

The end part 10b constituting the electric signal part including the electrode output terminal 11 of the pressure sensor is covered by the plating protective coat 10c such as silicone, etc., to prevent it from being affected by a plating solution (FIG. 2C).

Figure 2D:
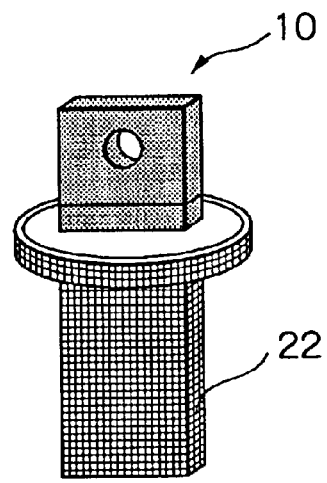

The thus formed pressure-sensing member 10 having the disc-like flange 20 is immersed in a plating bath of a nickel electrolyte, except the end part 10b covered with the plating protective coat 10c, to perform electroplating with nickel. As a result, a nickel plating (protective) layer 22 is formed on the pressure receiving part 10a of the pressure-sensing member 10 and periphery of the disc-like flange 20 (FIG. 2D).

When the flange 20, on which the nickel plating layer 22 is formed, is molded out of silicone or wax, it is dissolved by a solvent or by means of heating, whereby the flange 20 is removed. On the other hand, when the flange 20 is molded out of aluminum, the flange 20 is dissolved by a caustic soda, whereby the flange 20 is removed. Thus, the pressure-sensing member 10 covered with a nickel plating and provided with a concave nickel flange 23 with a raised edge on the peripheral rim, is obtained (FIG. 2E).

FIG. 3 illustrates a manufacturing process for fabricating a practical pressure sensor, especially a supporting member for installation of the sensor.

Figure 2E:
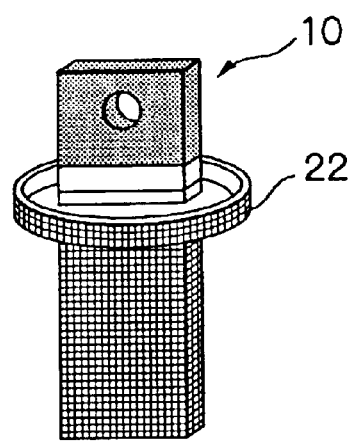
Figure 3B:
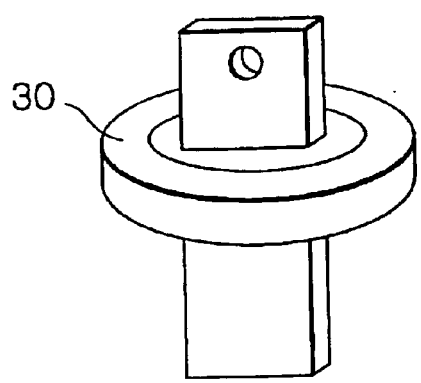

In the pressure-sensing member 10 indicated in FIG. 2E, the peripheral rim of the concave nickel flange 23 is inserted between the inside disc hardware 31 and the outside metal ring 32 (FIG. 3A) to form the supporting member 30 (FIG. 3B). The inside metal disc 31 has formed, in the center, a through-hole 31a corresponding to a cross section of the pressure-sensing member 10. The pressure-sensing member 10 is inserted into the through-hole 31a. The inside metal disc 31 and the outside metal ring 32 are both made of stainless steel. By, for example, applying from above an electron beam to the peripheral rim of the nickel flange 23 sandwiched between the inside metal disc 31 and the outside metal ring 32, the nickel of the peripheral rim part and the stainless steel of the inside metal disc 31 and outside metal ring 32 are melted to become one piece. Thereby, the pressure sensor is imparted with sufficient mechanical strength to be installed on a container for chemicals, pipe for chemicals, and the like.

Figure 4:
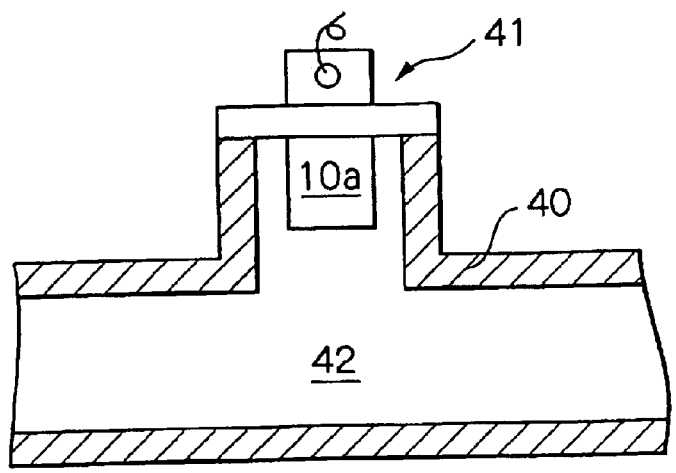
FIG. 4 illustrates an example of a diaphragm pressure sensor of the present invention installed on, for example, a pipe for chemicals.

FIG. 4 illustrates one example of the diaphragm pressure sensor 41 installed on the pipe for chemicals 40. As indicated in the drawing, the pressure receiving part 10a of the pressure-sensing member 10 of the diaphragm pressure sensor 41 is immersed directly in chemicals 42 in the pipe for chemicals 40.

What is claimed is:

1. An electrical capacitance-type diaphragm pressure sensor comprising:

a pressure-sensing member having a pressure receiving part formed from non-metallic strip diaphragms provided in opposing relation to each other, with deposited electrodes being formed on the opposing surfaces of the diaphragms, and depositing a metal on the diaphragms; and a nickel protective layer directly provided on said pressure-sensing member, wherby a fluid pressure to be sensed is transferred to said pressure receiving part via said nickel protective layer and variations in an amount of a gap between the deposited electrodes formed on the opposing faces of the opposing diaphragms cause changes in capacitance.

2. The diaphragm pressure sensor as defined in claim 1, wherein said pressure-sensing member is provided with a supporting member for installation.

3. The diaphragm pressure sensor as defined in claim 1, wherein the metal deposited on said diaphragm is any metal having a high ionization tendency, and selected from tin, copper, silver and gold.

4. A method of fabricating an electrical capacitance-type diaphragm pressure sensor for sensing a fluid pressure comprising the steps of:

providing non-metallic strip diaphragms in opposing relation and forming deposited electrodes on the opposing faces of said diaphragms, to thereby form a pressure-receiving part of a pressure-sensing member;

depositing a metal on said diaphragms in said pressure-sensing member except for an end part where an electrode output terminal is formed;

installing a soluble flange along the approximate border between said end part and pressure receiving part of said pressure-sensing member;

applying a nickel plating as a protective layer to said pressure receiving part and the periphery of said flange of said pressure-sensing member;

removing said flange except for said nickel-plated protective layer in said pressure-sensing member; and mounting a supporting member for installation in a region where said flange was removed except for said nickel-plated protective layer.

5. The method as defined in claim 4 further comprising, before the step of applying said nickel plating, the step of covering the end part of the pressure-sensing member where said electrode output terminal is formed with a protective coat, so that a nickel plating solution does not affect the end part.

6. The method as defined in claim 4 further comprising the step of immersing said nickel-plated protective layer in concentrated nitric acid, to thereby form over the nickel a passive state coat resistant to a strong acid solution.

7. The method as defined in claim 5 further comprising the step of immersing said nickel-plated protective layer in concentrated nitric acid, to thereby form over the nickel a passive state coat resistant to a strong acid solution.

* * * * *